(12) United States Patent
Beard (10) Patent No.: US 6,870,501 B2
(45) Date of Patent: Mar. 22, 2005

(54) DIGITAL RADIO FREQUENCY TAG

(75) Inventor: James K. Beard, Medford, NJ (US)

(73) Assignee: Raytheon Company, Waltham, MA (US)

( * ) Notice: Subject to any disclaimer, the term of this patent is extended or adjusted under 35 U.S.C. 154(b) by 455 days.

(21) Appl. No.: 09/891,786

(22) Filed: Jun. 26, 2001

(65) Prior Publication Data

US 2002/0196178 A1 Dec. 26, 2002

(51) Int. Cl.[7] .............................................. G01S 13/08
(52) U.S. Cl. ...................................................... 342/45
(58) Field of Search .............................. 342/42, 45, 51; 359/168; 340/10.4, 505

(56) References Cited

U.S. PATENT DOCUMENTS

| | | | |
|---|---|---|---|
| 4,566,009 A | * | 1/1986 | Hanni et al. |
| 5,438,332 A | * | 8/1995 | Adam et al. ................... 342/45 |
| 5,821,895 A | * | 10/1998 | Hounam et al. ............... 342/25 |
| 5,842,118 A | * | 11/1998 | Wood, Jr. ..................... 342/51 |
| 6,181,259 B1 | * | 1/2001 | Yamashita ................... 340/539 |
| 6,342,844 B1 | * | 1/2002 | Rozin ........................... 342/42 |

* cited by examiner

Primary Examiner—Bernarr E. Gregory
Assistant Examiner—Brian Andrea
(74) Attorney, Agent, or Firm—Leonard A. Alkov; Karl A. Vick (57) ABSTRACT

A digital RF tag (10) for providing an automatic reply to an electromagnetic signal. The system includes a radar receiver (11, 20); signal and data processors (50, 64) for analyzing the electromagnetic signal to extract data with respect thereto and for synthesizing a second electromagnetic signal; and a radar transmitter (11, 20). The radar receiver (11, 20) is a narrow band radar receiver. The use of a narrow band receiver minimizes power consumption and extends battery life. The inventive RF tag (10) tracks the received radar signal. The data processor (50) includes a microprocessor adapted to execute software designed to implement the tracking function. While the received radar signal is being tracked, type and timing data are extracted and used to synthesize a reply signal. The use of a synthesized reply signal, as opposed to a recorded and modified transmit signal as a reply signal, allows for the transmission of the cleaner (noise free) reply signal. In addition, other data including voice and video may be impressed onto the reply signal.

77 Claims, 8 Drawing Sheets

DIGITAL RADIO FREQUENCY TAG

This invention was made with Government support under Contract No. F30602-99-C-0186 awarded by the Air Force. The Government has certain rights in this invention.

BACKGROUND OF THE INVENTION

1. Field of the Invention

The present invention relates to communication systems. More specifically, the present invention relates to radio frequency tags.

2. Description of the Related Art

Radio frequency (RF) tags are well-known in the art. RF tags are small electronic devices that receipt and recognize radar signals of a particular type and generate and transmit a reply in response thereto. When received by the transmitting radar, the reply is decoded to ascertain the identity and location of the RF tag.

Conventional RF tags were simple repeaters designed to receive and report synthetic aperture radar (SAR) signals, shift the signal in Doppler, and transmit a reply with respect thereto using a technique known as "digital radio frequency memory" (DRFM). These devices also typically perform simple modifications of the received signal to send additional useful information.

One typical application for RF tags is to enable ground forces to communicate with airborne surveillance from standoff, i.e., non-vulnerable platforms, without being detected (low probability of detection) and homed on by their radio signals. Accordingly, the signal reply from the RF tag is typically designed to mimic reflections from surrounding terrain of radar signals from the surveillance platform.

Unfortunately, there many shortcomings associated with conventional RF tags. Firstly, the DRFM technique imposes a considerable constraint on the amount of data that can be transmitted. Secondly, there is little that can be done with a DRFM and, inasmuch as the tag is typically limited to a few bits of information, the data rates associated with the use of a DRFM are typically extremely low.

While this problem may be addressed to some extent by the use of a broadening modulation with a long pulse swept over a wide frequency band coupled with phase coding on the reply signal, this approach requires more energy for the reply signal to be decoded reliably at the aircraft. This broadening a waveform allows for the reply signal to be more easily discriminated relative to the reflections generated by the surrounding terrain and thus detected. The combination of higher energy levels and higher observeability of the reply signal renders this approach unattractive for the target application for RF tags. In addition, he higher power levels further limit battery life.

Thirdly, conventional RF tag designed is limited with respect to the types of radar signals that may be answered.

Finally, inasmuch as conventional RF tags transmit and receive data using simple analog modem techniques, these devices are susceptible to interference and dropouts.

Hence, a need remains in the art for a more robust, consistent, versatile RF tag capable of transmitting more data than conventional RF tags with a low probability of detection, while using less power.

SUMMARY OF THE INVENTION

The need in the art is addressed by the system and method for providing an automatic reply to an electromagnetic signal of the present invention. Generally, the inventive system includes a first subsystem for receiving a first electromagnetic signal; a second subsystem for analyzing the electromagnetic signal to extract data with respect thereto; a third subsystem responsive to the data for synthesizing a second electromagnetic signal; and a fourth subsystem for automatically transmitting the second electromagnetic signal.

In the illustrative embodiment, the first and second electromagnetic signals are radio frequency (radar) signals. Nonetheless, the invention is not limited thereto. The invention may be adapted to a system that employs optical, infrared, RF, and other types of communication systems. For the illustrative radio frequency application, the first subsystem is implemented with a variable bandwidth radar receiver. In accordance with the present teachings, the first and second subsystems track the first electromagnetic signal. In the illustrative implementation, the second subsystem includes a down converter, a digital signal processor, and a data processor. The data processor includes a microprocessor adapted to execute software designed to implement the signal parameter tracking function. While the received radar signal is being tracked, a narrow band receiver configuration and data acquisition (analog to digital conversion) method is used, and type and timing data are extracted and used to synthesize a reply signal.

Those skilled in the art will appreciate that the use of a synthesized reply signal, as opposed to a recorded and modified transmit signal as a reply signal, allows for the transmission of the cleaner (noise free) reply signal. In addition, other data including voice and video may be impressed onto the reply signal with high efficiency digital codes. The use of a narrow band receiver and data acquisition minimizes power consumption and extends battery life.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
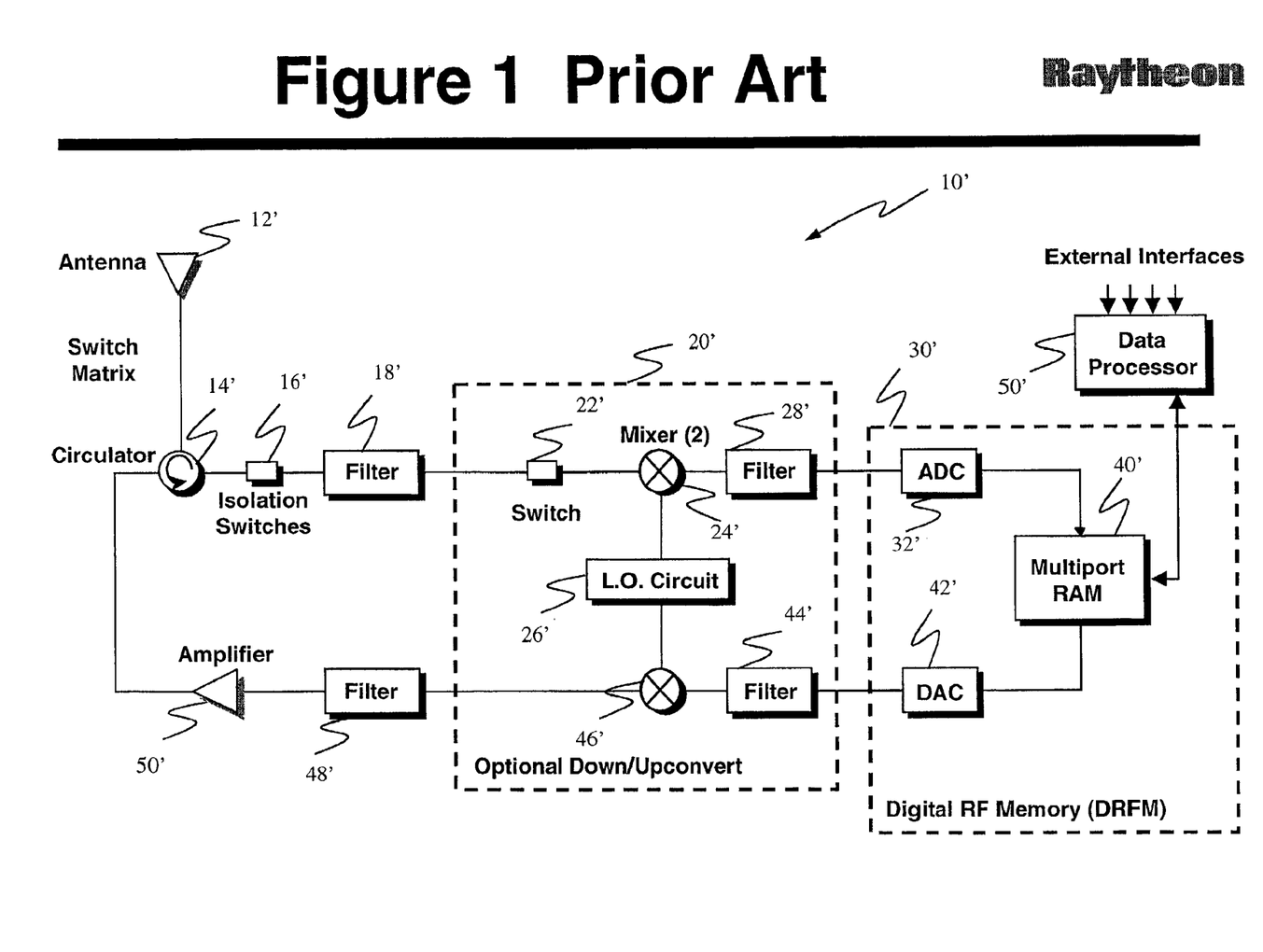
FIG. 1 is a block diagram of an RF tag implemented in accordance with conventional teachings.

FIG. 1 is a block diagram of an RF tag implemented in accordance with conventional teachings. The typical conventional tag 10' includes an RF antenna 12' which feeds a circulator 14'. The circulator 14' effects communication of received radar pulses to a filter 18' via an isolation switch 16'. The filtered signal is fed to a mixer 24' in an optional down/upconverter 20' via a second isolation switch 22'. The mixer 24' multiplies the filtered signal by a signal provided by a local oscillator 26' and passes the resulting downconverted signal to a second filter 28'. The output of the second filter 28' is digitized by an analog-to-digital converter 32' and fed to a multiport random access memory 40'. The multiport RAM 40' stores the received, downconverted and filtered signal. A data processor 50' then operates on the stored signal and impresses data thereon by selective bit reversal.

In accordance with conventional teachings, the RF tag of FIG. 1 is essentially a DRFM and contrary to the present invention, this modified recorded received signal is the reply signal. The reply signal is clocked out of the multiport RAM 40' by the data processor 50' to a digital-to-analog converter 42'. The DAC 42' digitizes the modified signal which is subsequently filtered, upconverted, if necessary, amplified and transmitted by filters 44' and 48', mixer 46' and amplifier 50' respectively.

Unfortunately, as mentioned above, there many shortcomings associated with conventional RF tags. Firstly, the DRFM technique imposes a considerable constraint on the amount of data that can be transmitted. Secondly, there is little that can be done with a DRFM and, inasmuch as the tag is typically limited to a few bits of information, the data rates associated with the use of a DRFM are typically extremely low. Thirdly, conventional RF tag designed is limited with respect to the types of radar signals that may be answered. Finally, inasmuch as conventional RF tags are implemented with analog circuitry, these devices are susceptible to interference and dropouts.

Hence, a need has remained in the art for a more robust, consistent, versatile RF tag capable of transmitting more data than conventional RF tags with a low probability of detection.

The need in the art is addressed by the system and method for providing an automatic reply to an electromagnetic signal of the present invention.

Figure 2:
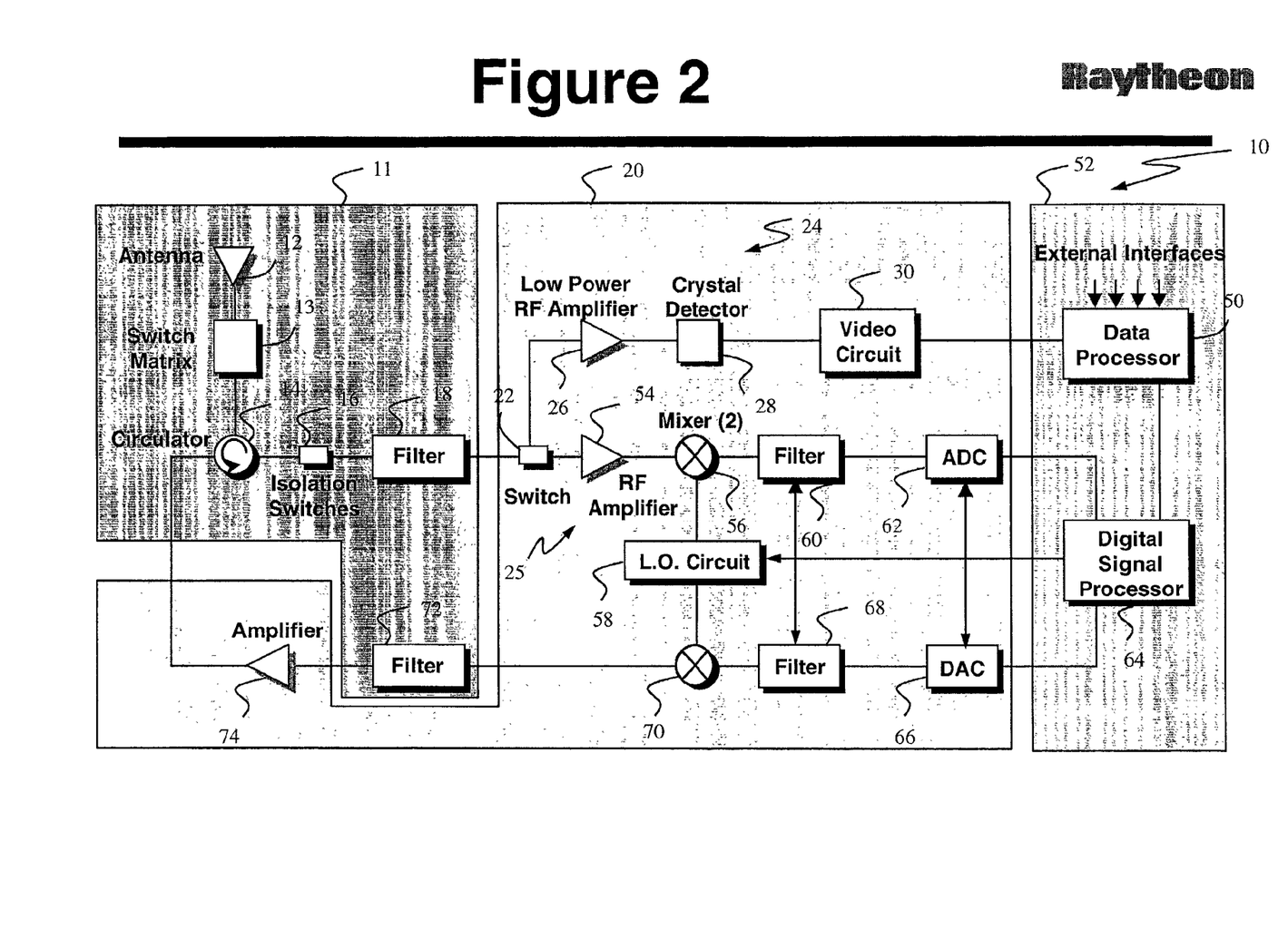
FIG. 2 is a block diagram of a radio frequency tag implemented in accordance with the teachings of the present invention.

FIG. 2 is a block diagram of a radio frequency tag implemented in accordance with the teachings of the present invention. The inventive RF tag 10 includes an RF front end 11 of conventional design comprising an antenna 12, a switch matrix 13, circulator 14, isolation switch 16 and filter 18. The RF front end circuit 11 feeds an analog front end comprising, in the illustrative embodiment, plural receivers here shown implemented as application specific integrated circuit (ASIC) elements. The output of the RF front end is coupled to an isolation switch 22 which, in turn, feeds a low-power wake up circuit 24 and a down/up converter 25. In a low-power standby mode of operation, the system 10 will be in a virtual 'OFF' state to conserve power and to enhance battery life.

The wake-up circuit 24 includes a low power RF amplifier 26 which feeds a crystal detector 28 and a video circuit 30 therethrough. The crystal detector 28 detects the presence of signals in a predetermined frequency range and provides an output with respect thereto. The video circuit is a low power amplifier that converts the output of the detector 28 into a logic signal. This signal is fed to a data processor 50. The data processor 50 analyzes the detected signal and checks it against a database of signals to which it is to respond. On the detection of one of a number of specified signals, the data processor 50 provides a trigger signal to effect activation of the down/up converter circuit 25. The data processor 50 may be implemented a low power general purpose microprocessor such as the Intel SA-1110 microprocessor and integrated memory (not shown).

When the down/up converter circuit 25 is activated, the received signal is forwarded by the isolation switch 22 to an RF amplifier 54. The received signal is then amplified and input to a mixer 56 were it is multiplied by a reference signal from a local oscillator circuit 58. The output of the mixer 56 is input to a first programmable bandwidth filter 60. The filtered signal is digitized by an analog to digital converter 62 and the digitized samples are input to a digital signal processor 64. The digital signal processor 64 provides signal analysis and synthesis, effects signal tracking, and may be implemented with a field programmable gate array (FPGA). In the best mode, the digital signal processor 64 is equipped with sufficient storage capacity to operate as a DRFM when necessary or desirable.

The output of the digital signal processor 64 is converted to analog by an digital to analog converter 66 and filtered by a second programmable filter 68 before being input to a second mixer 70. As discussed more fully below, software running on the data processor 50 effects acquisition and tracking of the received signal through the digital signal processor 64. Under control of the data processor 50, the digital signal processor 64 tracks the received signal by manipulating the reference frequency of the local oscillator circuit 58 and the pass bands of the programmable filters 60 and 68, the analog front end 20 may be implemented as a narrow band receiver. The signal upconverted by the mixer 70 is filtered by a filter 72 and amplified by an amplifier 74 before being transmitted by the antenna 12.

In accordance with the present teachings, the digital RF Tag 10:

1) Receives a surveillance radar signal, from either synthetic aperture radar (SAR) or ground moving target indication (GMTI) modes, 2) Recognizes the signals, 3) Determines the pattern of incident RF energy in time and frequency, 4) Decodes any data encoded on the radar signal for its use, 5) Synthesizes a modified radar signal containing data to be uplinked, and 6) Generates a synthetic uplink signal that is indistinguishable from energy reflected by the surrounding terrain i.e., a tree or large rock.

Once the pattern of incident energy is determined to sufficient accuracy, in accordance with the present teachings, the inventive RF Tag 10 can synchronize accurately with the radar signal and remove its primary modulation, allowing it to decode downlink information placed on the synthetic aperture radar (SAR) or ground moving target indicator (GMTI) mode radar waveform, and generate synthetic waveforms with information encoded on their waveforms that cannot easily be detected, intercepted, or demodulated by unfriendly forces.

Figure 3:
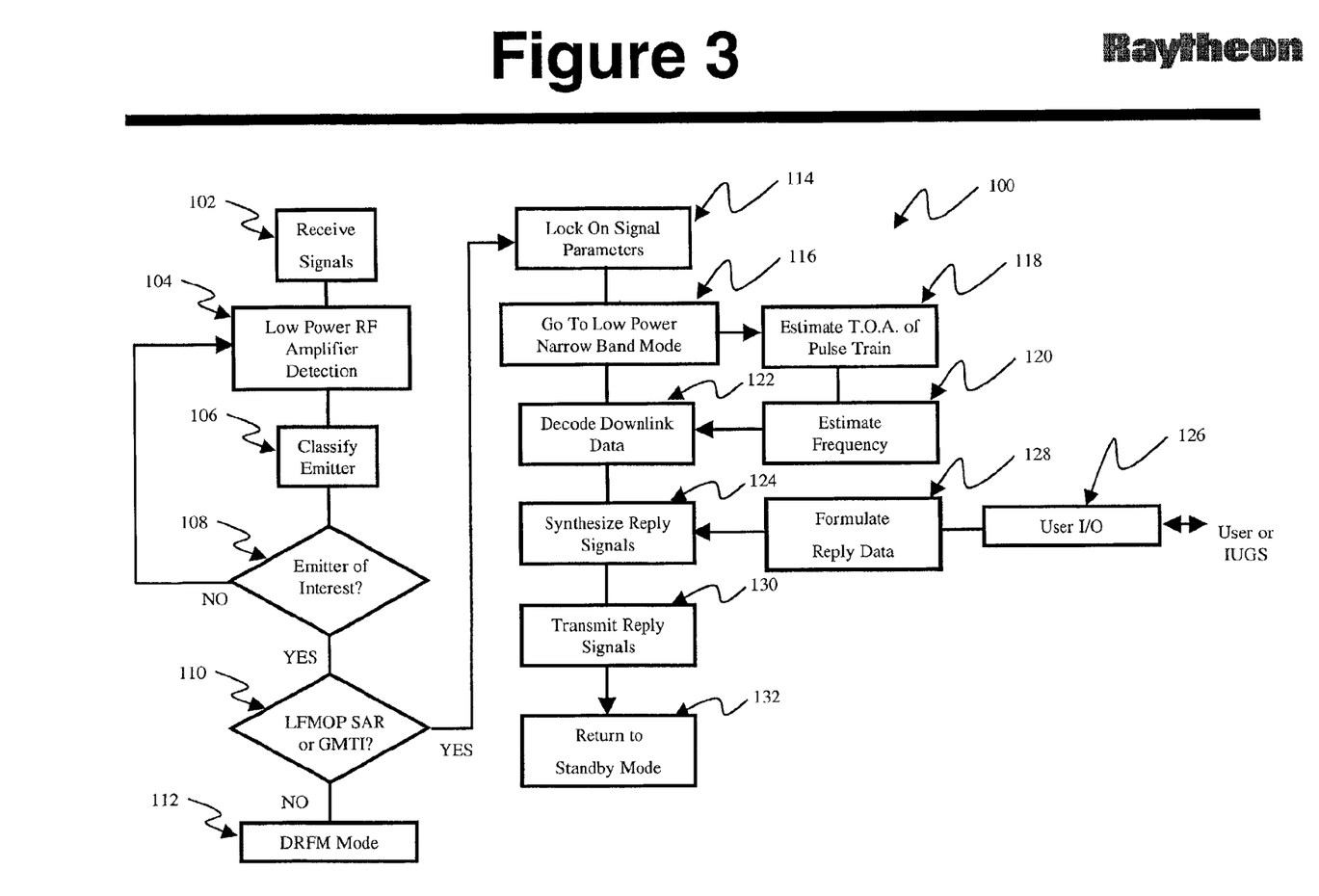
FIG. 3 is a flow diagram showing an illustrative embodiment of the method of operation of the digital RF tag of the present invention.

FIG. 3 is a flow diagram showing an illustrative embodiment of the method of operation of the digital RF tag of the present invention. As shown in FIG. 3, in the illustrative embodiment the inventive method 100 begins with the step (102) of receiving a radar pulse. The low power train shown in FIG. 2 (RF amplifier 26, crystal detector 28 and video circuit 30, with the on-board processor clock) provide the data processor 50 with time of arrival data on the pulse train. The data processor uses this data as discussed more fully below to determine whether the radar is an emitter of interest (step 108) and a linear frequency modulated pulse (LFMOP) synthetic aperture radar (SAR) or ground moving target indicator (GMTI) radar. If the emitter is of interest but is not using LFMOP modulation, the Digital RF Tag operates in the DRFM mode as in prior art. If LFMOP modulation is in use, the Digital RF Tag turns on the downconvert and signal processing system blocks and puts the data processor in the full clock rate mode. This enables the hardware to perform step 114 and lock on to the radar pulse train parameters. This pulse train data allows the Digital RF Tag to put the downconvert and data acquistion functions in a dechirp-on-receive narrow band mode, achieving major power savings and enabling high efficiency data decoding. The steps of signal acquisition or 'lock on' and subsequent signal recognition include the steps of tracking signal (steps 118 and 120) and downlink decode (step 112). The signal recognition step (steps 118 and 120) includes the steps of estimating the time of arrival of pulses (step 118), estimation of frequency (step 120). This estimation of pulse train parameters and determination of the pattern of RF energy in the received pulse enables the synthesizing of reply signals (step 124) with sufficient accuracy so that low probability of intercept is enhanced over DRFM methods. User I/O data or Internetted Unattended Ground Sensor (IUGS) data is encoded using error correction and data channel coding such as Turbo Codes, and the reply data is formulated according to data rate and probability of intercept requirements (step 128). The reply data is transmitted using a narrow band DDS and an upchirp on the L.O. to achieve a replica of the radar signal (step 130). When the mission is complete or the radar is no longer seen by the Digital RF Tag, the system returns to the standby mode (step 132).

In the process of operation with a passing SAR or GMTI radar, the Digital RF Tag operates in four modes: a standby mode in which only the low power RF amplifier, the video circuit, and the data processor (in low clock rate, low power mode) are powered on, an alerted mode in which the L.O. circuit, ADC and digital signal processor are powered on and the data processor is operated at full clock rate, a low power mode where the filters following the downconvert mixer and the ADC are switched to narrowband mode, and the uplink mode.

A critical link in the RF tag mission timeline is the acquisition of the received SAR or GMTI radar waveform. This process is analogous to the familiar dial-up modem lock-on process. Fundamental differences include:

a) other signals are normally present during the acquisition and repeater process, b) the digital RF Tag acquisition process is strictly autonomous, and c) GMTI beam scanning forces acquisition and uplink to be accomplished with multiple beam dwells not under the control of the RF tag.

Figure 4:
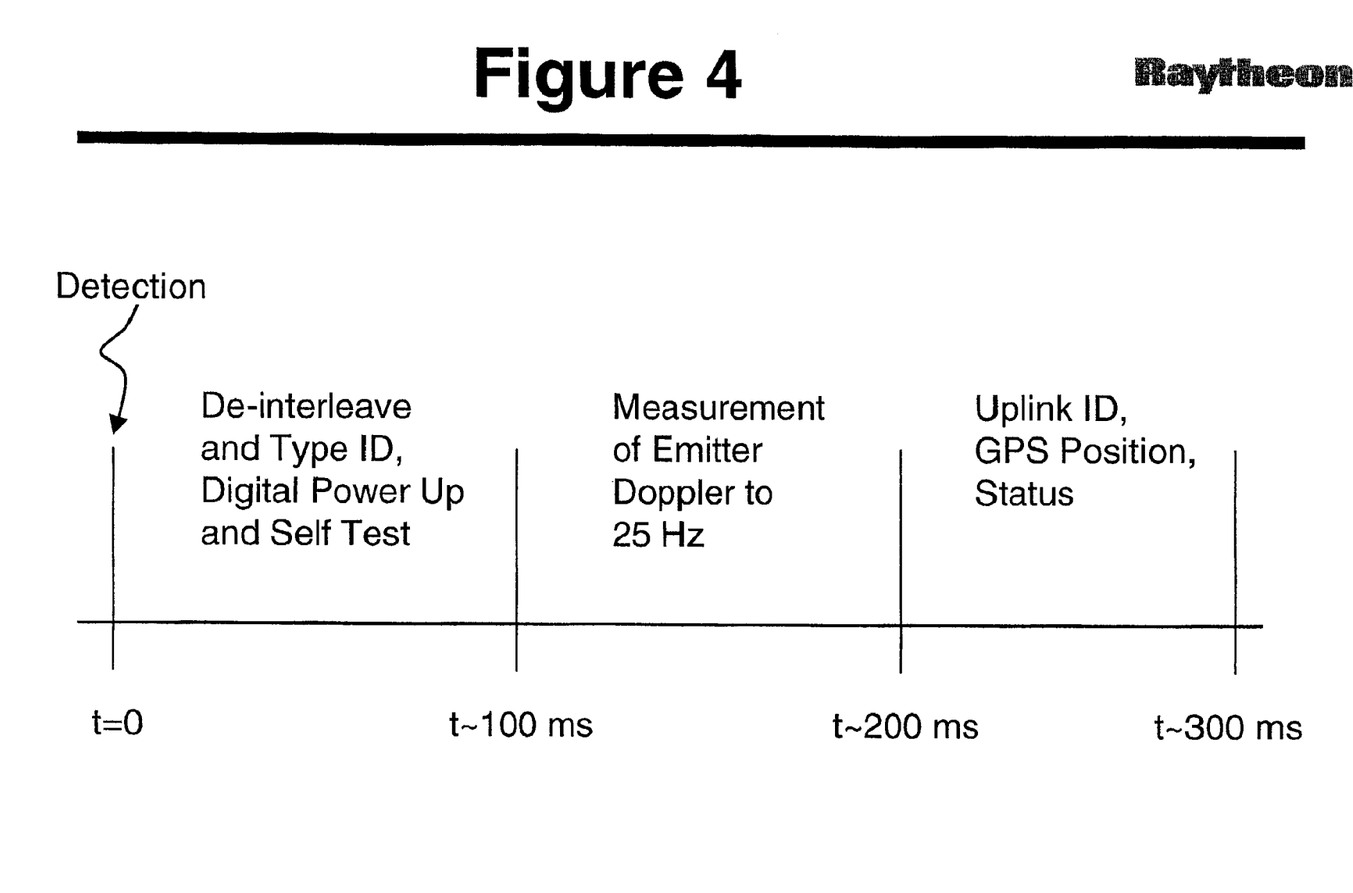
FIG. 4 is a diagram showing a notional mission timeline of the inventive digital RF Tag for link-up.

FIG. 4 is a diagram showing a notional mission timeline of the inventive digital RF Tag for link-up. The inventive RF tag 10 accomplishes the functions of acquisition of the signals and data as follows.

Signal Recognition: In the process of waiting for an appropriate radar signal to come into range, the digital RF Tag 10 receives radar signals in X band and/or other appropriate bands using a special low power mode. Times of arrival and crude signal strengths are available in this mode. This data is used to provide a set of times of arrival of pulses to the data processor 50 a FIG. 2. Software running on the data processor 50 provides a database-supported pulse de-interleave and radar type and mode identification function.

Initial Estimation of Time of Arrival: The first step in lock-on to a SAR or GMTI pulse train is estimation of the times of arrival of the pulses. In accordance with a present teachings, pulse amplitude envelope data from complex data provided by receiver data acquisition is used. When a pulse is detected through a simple threshold, its maximum peak value is found by scanning in time near the detection point and two amplitude points straddling the half amplitude point are given to the time of arrival estimation algorithm. An optimal estimation process such as the method of maximum likelihood would provide the time of arrival of the pulse from this data. The RMS error in time of arrival ($\sigma_t$) of a single pulse in nanoseconds is:

$$\sigma_t \approx \frac{0.15 + 1.8 \cdot F_{samp} \cdot dt}{F_{samp} \cdot SNR} \quad [1]$$

where $F_{samp}$ is the sample rate, SNR is the signal to noise power ratio in the total I.F. band, and dt is the time from the start of the pulse to the first data point given to the algorithm.

Figure 5:
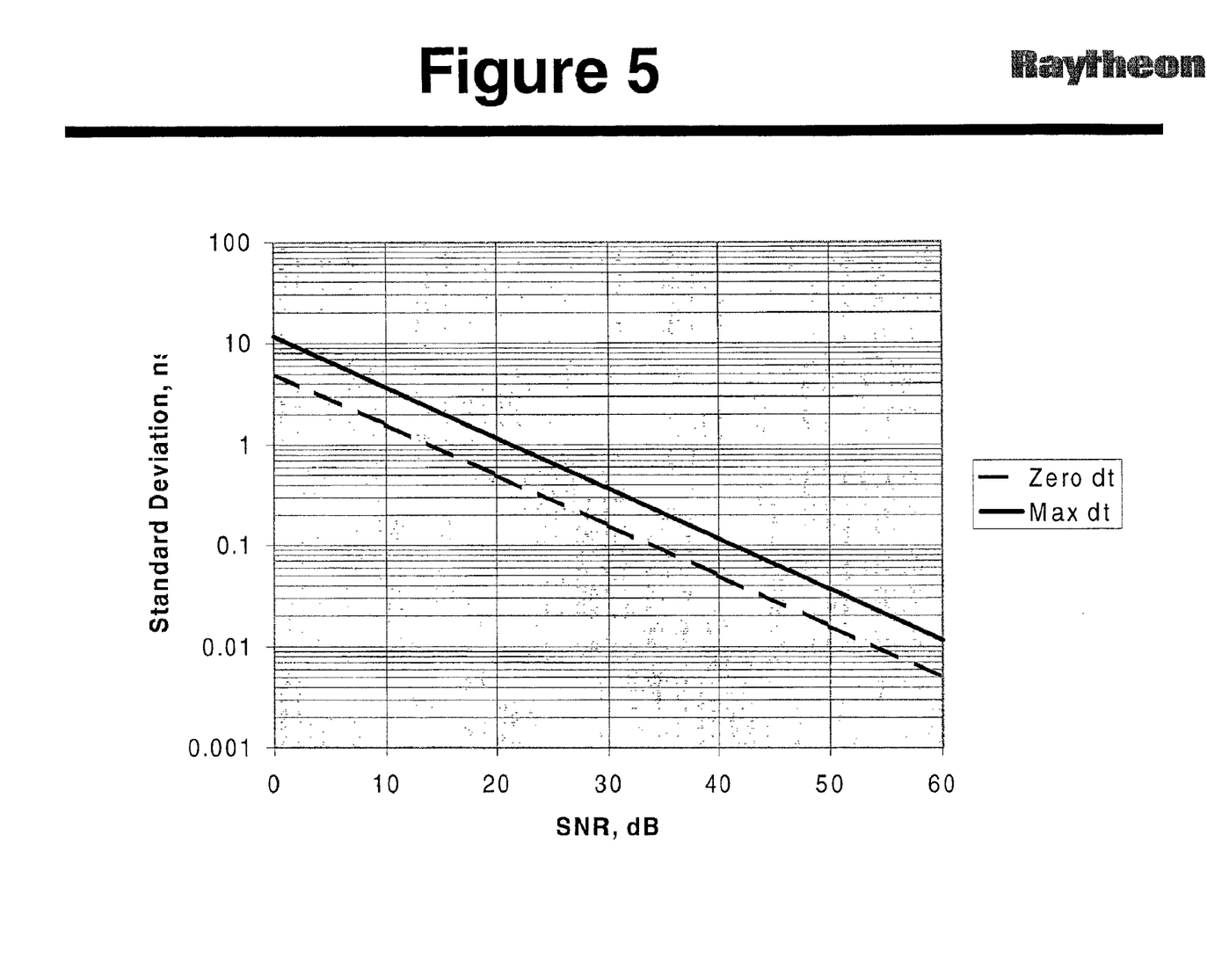
FIG. 5 shows a curve of RMS error in time of arrival versus SNR for an illustrative implementation of a digital RF tag in accordance with the teachings of the present invention.

FIG. 5 shows a curve of RMS error in time of arrival versus SNR for an illustrative implementation of a digital RF tag in accordance with the teachings of the present invention. More sophisticated methods such as estimation of the pulse shape may be used because these are simple extensions that allow poorer quality data and increase robustness without changing the basic nature of the invention, to wit, estimating time of arrival as one of the functions in the lock-on process.

Initial Estimate of Frequency: SAR and GMTI waveforms are, most often, linear frequency modulated pulses (LFMOPs), or chirped waveforms. Other waveforms such as QPSK modulated pulses are treated as CW waveforms by detection and use of any single tonal line in the pulse spectrum. A fall-back option for the digital RF Tag of the present invention is to simply digitally record the pulse data and repeat it with modulation, which is the digital RF memory (DRFM) based technique used with analog RF tags as in step 120 of FIG. 3.

Figure 6:
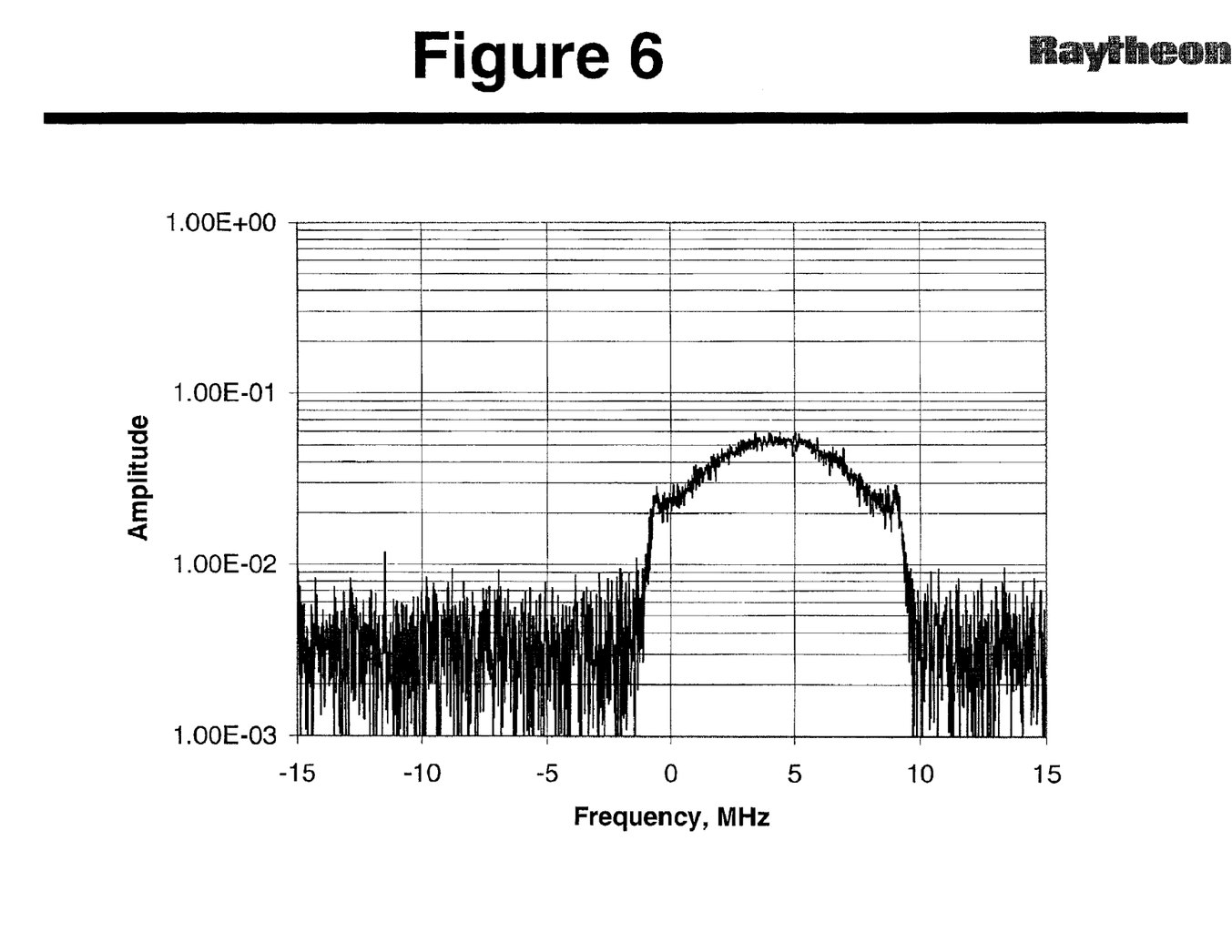
FIG. 6 is a diagram showing a result of an Fast Fourier Transform (FFT) of a waveform that chirps through a 30 MHz intermediate frequency (I.F.) band.

FIG. 6 is a diagram showing a result of an Fast Fourier Transform (FFT) of a waveform that chirps through a 20 MHz badnwidth with a 4 MHz offset from the center of the I.F band. The amplitude versus time curve seen on the pulse spectrum is due to the spectral window used with the FFT. The present invention estimates the frequency-time ambiguity of the pulse with an optimal estimation algorithm that also provides the total pulse energy or amplitude. The method uses phase changes between the samples in an optimal estimation method such as the method of maximum likelihood to determine the frequency versus time locus of the pulse from the complex digitized I.F. data.

Another such method finds the portion of the pulse between the half-amplitude points and converts this portion into amplitude and ambiguous phase, then executes a quadratic fit on the ambiguous phase. An FFT that uses this information to de-chirp the pulse by applying an equal but opposite chirp to the spectral window of the FFT is shown as FIG. 7.

Figure 7:
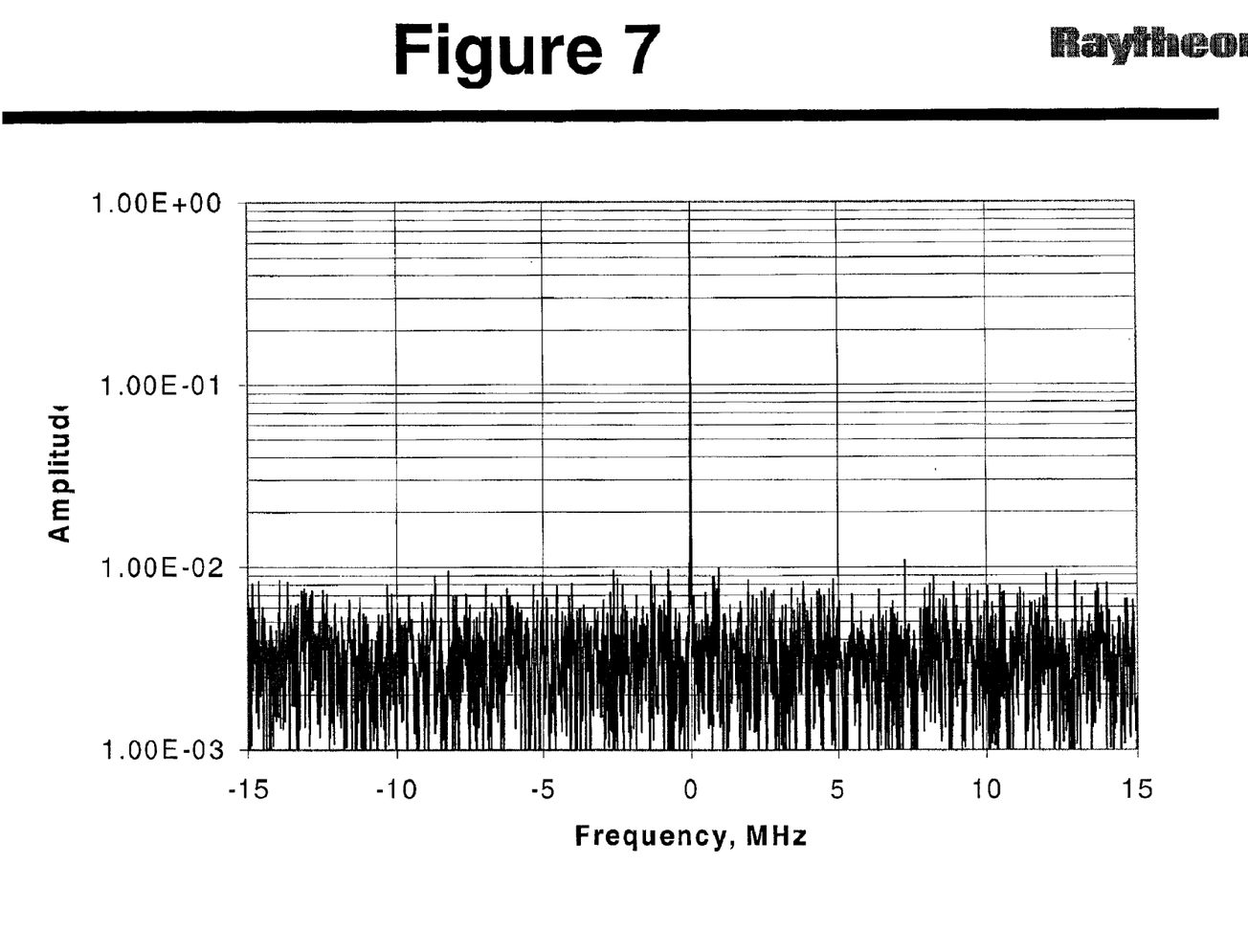
FIG. 7 is a diagram showing a pulse spectrum with data-driven de-chirp.

FIG. 7 is a diagram showing a pulse spectrum with data-driven de-chirp. Examination of the amplitude and phase of this central peak, as provided by the FFT, also allows the inventive digital RF Tag 10 to determine errors in the dechirp parameters and correct them in a control loop that closely tracks frequency and arrival time of the pulses.

Figure 8:
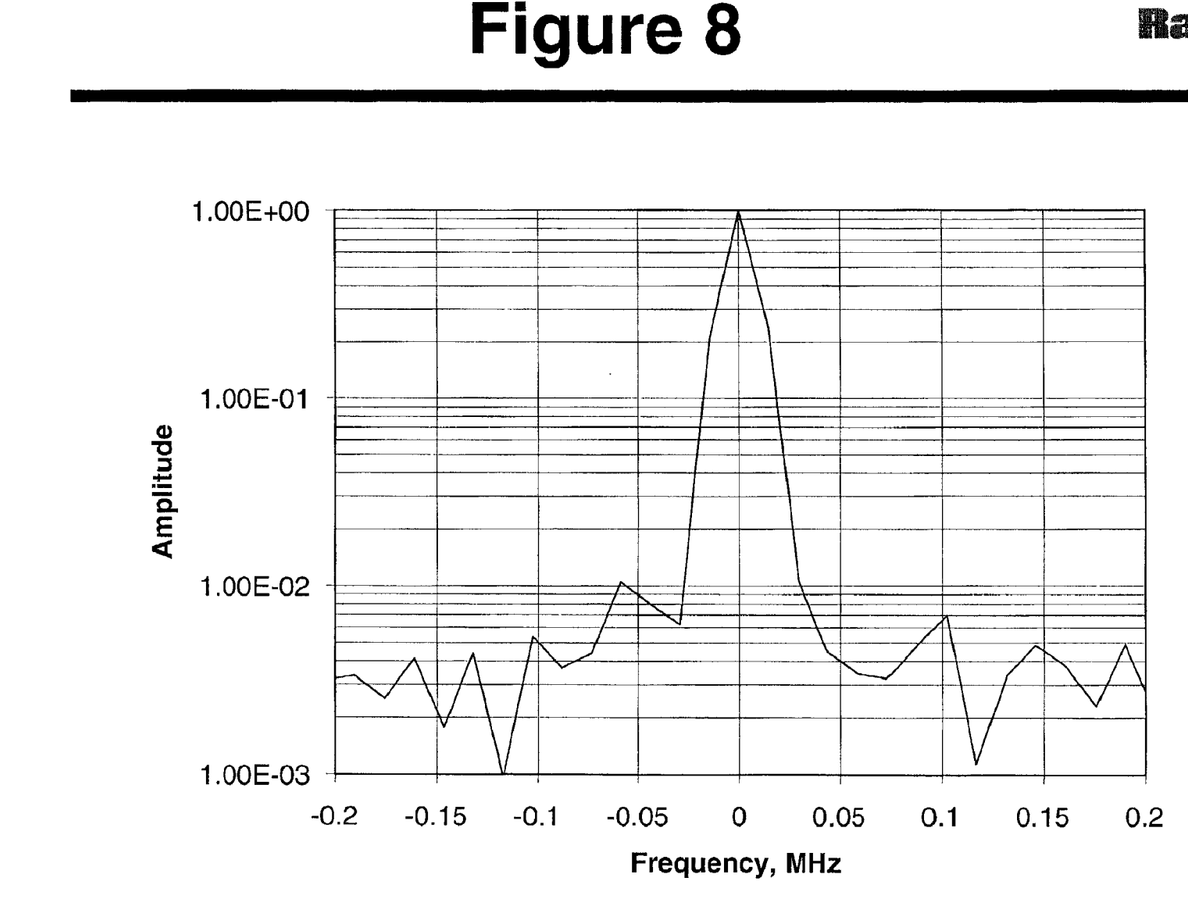
FIG. 8 shows a close-up on the central peak of FIG. 7, showing that the central peak is that of an FFT of the spectral window used with the FFT.

FIG. 8 shows a close-up on the central peak of FIG. 7, showing that the central peak is that of the Fourier transform of the spectral window used with the FFT. Final frequency-time information is obtained from the data as shown in the FIG. 8 by finding the peak due to the concentrated pulse energy and re-estimating the pulse position and amplitude from the FFT output data in the pulse parameter tracking control loop as described above. FIG. 8 shows that centroiding or peak position estimation using knowledge of the shape of the peak, as defined by the signature of tonal lines with the spectral window used with the FFT, allows estimation of frequency that is improved as SNR increases. The equation is similar to Equation [1] above given for RMS time of arrival error. Combining the time of arrival and the time-frequency information found in this way provides the digital RF Tag with data on the start time of the pulse and the time-frequency locus of the pulse. A decoupled estimation process tracks the half-amplitude point that defines the trailing edge of the pulses.

With SAR signals, this information provides final verification of radar type and mode. Also, this information is used to program a direct digital synthesis (DDS) in the receiver exciter and local oscillator (L.O.) architecture that dechirps the signal on receive. Dechirp on receive allows the digital RF Tag to capture the entire duration of wide bandwidth linear frequency modulated pulse (LFMOP) SAR waveforms in much narrower I.F. bandwidths, providing much more accurate estimation of the time-frequency ambiguity on each pulse. Similarly, re-chirp on transmit allows the DDS performance capabilities to be used to encode data rather than to replicate LFMOP chirp and thus operate at lower power, and the clean up filter following the DDS provides a much cleaner signal for uplink, enhancing low probability of intercept properties.

A typical signal to noise ratio (SNR) required for robust operation using the incoherent technique, giving only the phases of the digitized I.F. data to the algorithm, is 18.5 dB or more. Use of the complex I.F. data will provide robust operation with lower SNR values, but the algorithm is more complex because of the algorithmic nature of the ambiguities. Such variations are due to simple trades of minimum SNR for computational complexity and within the scope of a present invention.

Use of Data from Multiple Pulses to Estimate Pulse Train Parameters: This function provides the digital RF Tag with the data required to generate waveforms that achieve the highest possible data rates while maintaining the lowest possible RF signature, providing low probability of intercept (LPI) and low probability of detection (LPD) characteristics. This function is necessary even with full knowledge of the SAR or GMTI radar platform and its mode. This is because frequency accuracies required for proper generation of uplink waveforms exceed the accuracy of the RF generation of the Digital RF Tag, and possibly the long-term stability of the RF generation of the SAR or GMTI radar platform. This is in contrast with prior art, because DRFM techniques can use data from only the single pulse captured in digital memory for formation of uplink data.

The present invention provides improved information on pulse train frequency and timing through incorporation of another optimal estimation algorithm when the SNR allows. Doppler is modeled as time scaling of the signal in the method, which exploits the fact that the observed pulse repetition frequency (PRF) changes by the same percentage from its zero range rate value as the Doppler shift is of the radar center frequency. This allows estimation of the radar center frequency as well as its Doppler shifted observed value. This allows the Digital RF Tag to turn off its receiver and "coast" for long periods, although tracking of the time of arrival of the leading edge of the received pulses is also done to ensure robustness.

The performance of this type of method in estimating time of arrival and Doppler shifted frequency is:

$$\sigma_f = \frac{\sigma_{freqmeas}}{\sqrt{N}}, \sigma_t \geq \approx \frac{2 \cdot \sigma_{tmeas}}{\sqrt{N}}, N = PRF \cdot t \quad [2]$$

where t is the total dwell of the radar on the digital RF Tag's position. The complexities in this equation that result when a radar in a GMTI mode scans repeatedly past a Digital RF Tag position are well known.

Returning to FIG. 3, the received pulse is decoded and down link data is extracted at step 112. The resulting user data is output at step 130 via a user interface 126. At step 124, a reply signal is synthesized by the digital signal processor 64 in accordance with parameters provided by the data processor 50. Data to be included in the uplink signal is received from a user at step 126 and incorporated into the reply signal at step 124. This data may include position data such as may be provided by a GPS position location system.

At step 130, the synthesized reply signal is transmitted and the system returns to a standby or "sleep" mode at step 132. Those skilled in the art will appreciate that the software running on the data processor may effect a random transmission of the reply signal or a scheduled transmission of same. Further, the desired time of transmission may be encoded in the down link signal and extracted therefrom.

In short, the inventive system generally includes a first subsystem for receiving a first electromagnetic signal; a second subsystem for analyzing the electromagnetic signal to extract data with respect thereto; a third subsystem responsive to the data for synthesizing a second electromagnetic signal; and a fourth subsystem for automatically transmitting the second electromagnetic signal.

In the illustrative embodiment, the first and second electromagnetic signals are radio frequency (radar) signals. Nonetheless, the invention is not limited thereto. The invention may be adapted to a system that employs optical, infrared, and other types of communication systems. For the illustrative radio frequency application, the first subsystem is implemented with a narrow band radar receiver. In accordance with the present teachings, the first and second subsystems track the first electromagnetic signal. In the illustrative implementation, the second subsystem includes a down converter, a digital signal processor, and a data processor. The data processor includes a microprocessor adapted to execute software designed to implement the tracking function. While the received radar signal is being tracked, type and timing data are extracted and used to synthesize a reply signal.

Those skilled in the art will appreciate that the use of a synthesized reply signal, as opposed to a recorded and modified transmit signal as a reply signal, allows for the transmission of the cleaner (noise free) reply signal. In addition, other data including voice and video may be impressed onto the reply signal. The use of a narrow band receiver minimizes power consumption and extends battery life.

The features of the present invention can be described as follows:

1. The inventive RF tag effects conservation of power until the proper surveillance radars are within operating ranges. This information allows de-interleaving of pulse information and consequent radar type and mode identification.

2. Separate and simultaneous use of data obtained by data acquisition at I.F. allows simultaneous estimation of time of arrival, center frequency, and chirp rate for each individual pulse through digital signal and data processing.

3. Estimation of time of arrival and frequency-time ambiguity allow the inventive digital RF Tag to de-chirp broad bandwidth SAR signals on receive.

4. Use of data from individual pulses by the methods described here, variations on these methods, and other methods that serve the same purpose can be combined to provide improved estimation of Doppler shifted frequency and pulse burst timing.

5. Pulse burst timing and Doppler shifted frequency can be estimated by the methods described here, variations on these methods, and other methods that serve the same purpose to provide timing and frequency estimates that support the requirements of Digital RF Tags, to wit: data sufficiently accurate regarding timing, frequency, and amplitude of impinging surveillance radar RF energy so that the digital RF Tag can generate synthetic waveforms that fully exploit the surveillance radar signal spectrum to maximize the robustness and data rates of uplinks while maximizing LPI/LPD characteristics of the digital RF Tag.

Thus, the present invention has been described herein with reference to a particular embodiment for a particular application. Those having ordinary skill in the art and access to the present teachings will recognize additional modifications applications and embodiments within the scope thereof. For example, the present invention calls for the two-way communication of voice, video and other data. Further, the invention is not limited to the use of radar signals. Optical and infrared signals may be utilized without departing from scope of teachings.

It is therefore intended by the appended claims to cover any and all such applications, modifications and embodiments within the scope of the present invention.

Accordingly,

What is claimed is:

1. A system for providing an automatic reply to a first electromagnetic signal comprising:
   first means for receiving said first electromagnetic signal;
   second means for analyzing said electromagnetic signal to identify a format type of the received signal and provide data with respect thereto;
   third means responsive to said data for synthesizing a second electromagnetic signal, said second signal being substantially identical to and electrically independent of said first signal; and
   fourth means for automatically transmitting said second electromagnetic signal.

2. The invention of claim 1 further including a wake-up circuit.

3. The invention of claim 1 wherein said first and second electromagnetic signals are radio frequency signals.

4. The invention of claim 3 wherein said first means is a radio frequency receiver.

5. The invention of claim 4 wherein said radio frequency receiver is a narrow band receiver or a narrow band mode of a variable bandwidth receiver.

6. The invention of claim 4 wherein said first and said second means comprise means for tracking said first electromagnetic signal.

7. The invention of claim 6 wherein said second means includes a down converter.

8. The invention of claim 7 wherein said down converter includes a first mixer driven by a local oscillator circuit.

9. The invention of claim 8 wherein said second means further includes a programmable filter connected to the output of said mixer.

10. The invention of claim 9 wherein said second means further includes an analog to digital converter connected to the output of said filter, to include a programmable data rate analog to digital converter.

11. The invention of claim 10 wherein said second means further includes a digital signal processor connected to the output of said analog to digital converter.

12. The invention of claim 11 wherein said second means includes a data processor.

13. The invention of claim 12 wherein said data processor includes a microprocessor.

14. The invention of claim 13 wherein said second means includes software adapted for execution by said microprocessor.

15. The invention of claim 14 wherein said software includes code for tracking said first electromagnetic signal and providing said data with respect thereto.

16. The invention of claim 14 wherein said software includes code for identifying a timing characteristic of said first electromagnetic signal and providing said data with respect thereto.

17. The invention of claim 14 wherein said software includes code for identifying a format of said first electromagnetic signal and providing said data with respect thereto.

18. The invention of claim 1 wherein said third means includes a data processor.

19. The invention of claim 18 wherein said data processor includes a microprocessor.

20. The invention of claim 19 wherein said third means includes software adapted for execution by said microprocessor.

21. The invention of claim 20 wherein said third means includes a digital signal processor.

22. The invention of claim 21 wherein said digital signal processor is a field programmable gate array.

23. The invention of claim 21 wherein said third means further includes a digital to analog converter.

24. The invention of claim 23 wherein said third means further includes a programmable filter.

25. The invention of claim 1 wherein said fourth means includes an up converter.

26. The invention of claim 1 wherein said up converter includes a mixer driven by a local oscillator circuit.

27. The invention of claim 1 wherein said fourth means includes means for transmitting said second electromagnetic signal in response to receipt of said first electromagnetic signal.

28. The invention of claim 1 wherein said second means includes means for transmitting said second electromagnetic signal during a predetermined time interval.

29. The invention of claim 1 wherein said second means includes means for transmitting said second electromagnetic signal during a time interval decoded from said first electromagnetic signal.

30. The invention of claim 1 wherein said second means includes means for transmitting said second electromagnetic signal during a substantially random time interval.

31. The invention of claim 1 further including fifth means for receiving user data via an external interface.

32. The invention of claim 31 further including means for encoding data in said second signal in response to said user data.

33. The invention of claim 32 wherein said user data includes voice data.

34. The invention of claim 32 wherein said user data includes video data.

35. The invention of claim 32 wherein said user data includes position data.

36. The invention of claim 35 wherein said position data is Global Positioning System data.

37. The invention of claim 31 further including means for extracting user data from said first electromagnetic signal and outputting said user data via said external interface.

38. The invention of claim 1 wherein said first electromagnetic signal is optical.

39. The invention of claim 38 wherein said first electromagnetic signal is infrared.

40. The invention of claim 1 wherein said second electromagnetic signal is optical.

41. The invention of claim 40 wherein said second electromagnetic signal is infrared.

42. A digital radio frequency tag comprising:
   a radio frequency receiver adapted to receive a first radio frequency signal;
   a data processor connected to said receiver and adapted to analyze the first radio signal to identify a format type thereof and compare type thereof to a database of signals and provide data with respect thereto;
   a signal generator adapted to synthesize a second electromagnetic signal in response to said data, said second radio frequency signal being substantially identical to and independent of said first signal; and
   a radio frequency transmitter adapted to transmit said second radio frequency signal.

43. A method for providing an automatic reply to a first electromagnetic signal including the steps of:
   receiving said first electromagnetic signal;
   analyzing said electromagnetic signal to identify a format type of the received signal and provide data with respect thereto;
   synthesizing a second electromagnetic signal in response to said data, said second signal being substantially identically independent of said first signal; and
   automatically transmitting said second electromagnetic signal.

44. The invention of claim 1 further including means for comparing the format of the received signal to a database and providing an output in response thereto.

45. A system for providing an automatic reply to a first electromagnetic signal comprising:
   means for receiving a surveillance radar signal;
   means for recognizing a format type of said signal;
   means for decoding data encoded on said radar signal; and
   means for synthesizing a modified radar signal in response to the recognized format of said signal, said modified signal being a low probability of intercept signal and being electrically independent of said received signal.

46. The invention of claim 45 further including means for encoding data on said synthesized signal.

47. The invention of claim 46 further including means for determining a pattern of incident radio frequency energy of said signal in time and frequency.

48. The invention of claim 47 including means responsive to said means for determining a pattern of incident radio frequency energy of said signal in time and frequency for encoding said uplink signal such that it is indistinguishable from energy reflected by surrounding terrain.

49. The invention of claim 1 wherein said first signal is a synthetic aperture radar signal.

50. The invention of claim 1 wherein said first signal is a GMTI signal.

51. The invention of claim 1 further including means for determining a pattern of incident energy in said first signal.

52. The invention of claim 51 wherein said pattern is determined in time.

53. The invention of claim 52 wherein said pattern is determined in frequency.

54. The invention of claim 1 wherein said second means further includes means for estimating time of arrival of pulses in said first signal.

55. The invention of claim 42 wherein said first signal is a synthetic aperture radar signal.

56. The invention of claim 42 wherein said first signal is a GMTI signal.

57. The invention of claim 42 further including means for determining a pattern of incident energy in said first signal.

58. The invention of claim 57 wherein said pattern is determined in time.

59. The invention of claim 58 wherein said pattern is determined in frequency.

60. The invention of claim 42 wherein said tag further includes means for estimating time of arrival of pulses in said first signal.

61. The invention of claim 43 wherein said first signal is a synthetic aperture radar signal.

62. The invention of claim 43 wherein said first signal is a GMTI signal.

63. The invention of claim 43 further including the step of determining a pattern of incident energy in said first signal.

64. The invention of claim 63 wherein said pattern is determined in time.

65. The invention of claim 64 wherein said pattern is determined in frequency.

66. The invention of claim 43 wherein said step of analyzing further includes the step of estimating a time of arrival of pulses in said first signal.

67. The invention of claim 45 wherein said radar signal is a synthetic aperture radar signal.

68. The invention of claim 45 wherein said radar signal is a GMTI signal.

69. The invention of claim 45 further including means for determining a pattern of incident energy in said radar signal.

70. The invention of claim 69 wherein said pattern is determined in time.

71. The invention of claim 70 wherein said pattern is determined in frequency.

72. The invention of claim 45 wherein said means recognizing further includes means for estimating time of arrival of pulses in said first signal.

73. The invention of claim 1 wherein said system further includes means for providing real time two-way communication.

74. The invention of claim 42 wherein said tag further includes means for providing real time two-way communication.

75. The invention of claim 43 further including the step of providing real time two-way communication.

76. The invention of claim 45 wherein said system further includes means for providing real time two-way communication.

77. A digital radio frequency tag comprising:
   first means for receiving and recognizing a signal and automatically synthesizing a reply in response thereto and
   second means coupled to said first means for providing real time two-way communication.

* * * * *